(12) United States Patent
O'Connor et al.

(10) Patent No.: US 8,092,558 B2
(45) Date of Patent: Jan. 10, 2012

(54) MICROCHANNEL REACTOR MODULE FOR HYDROGEN RELEASE

(75) Inventors: David G. O'Connor, North Bend, WA (US); Robert B. Nelson, Snoqualmie, WA (US)

(73) Assignee: Asemblon, Inc., Redmond, WA (US)

( * ) Notice: Subject to any disclaimer, the term of this patent is extended or adjusted under 35 U.S.C. 154(b) by 495 days.

(21) Appl. No.: 12/356,328

(22) Filed: Jan. 20, 2009

(65) Prior Publication Data
US 2009/0185964 A1 Jul. 23, 2009

Related U.S. Application Data

(60) Provisional application No. 61/022,621, filed on Jan. 22, 2008.

(51) Int. Cl.
*B01J 7/00* (2006.01)
*B01J 8/00* (2006.01)
*C10B 1/00* (2006.01)

(52) U.S. Cl. .......... 48/61; 48/89; 48/119; 48/127.9; 216/65; 216/94; 427/555; 427/556; 427/240; 427/407.1; 204/192.15; 204/192.17

(58) Field of Classification Search .......... 48/61, 89, 48/119, 127.9; 216/65, 94; 427/555, 556, 427/240, 407.1; 204/192.15, 192.17
See application file for complete search history.

(56) References Cited

U.S. PATENT DOCUMENTS

| 7,896,935 | B2 * | 3/2011 | Tonkovich et al. | .......... 48/127.7 |
| 2006/0179718 | A1 * | 8/2006 | Whyatt et al. | .......... 48/198.7 |
| 2006/0207877 | A1 * | 9/2006 | Schmidt et al. | .......... 204/400 |

* cited by examiner

*Primary Examiner* — Timothy Vanoy

(57) ABSTRACT

There is disclosed a microchannel reactor module for the immediate catalytic release of hydrogen from hydrogenated organic molecules along with the recovery of hydrogen gas and the recovery of dehydrogenated organic molecules as a liquid. More specifically, the disclosure provides a polyimide-based microchannel plate that is particularly useful for a process of immediate catalytic release of hydrogen from a hydrogenated organic molecule or formulation of molecules.

10 Claims, 5 Drawing Sheets

MICROCHANNEL REACTOR MODULE FOR HYDROGEN RELEASE

CROSS REFERENCE TO RELATED APPLICATION

This patent application claims priority from U.S. provisional patent application 61/022,621 filed on 22 Jan. 2008, the disclosure of which is incorporated by reference herein.

TECHNICAL FIELD

This disclosure provides a microchannel reactor module for the immediate catalytic release of hydrogen from hydrogenated organic molecules along with the recovery of hydrogen gas and the recovery of dehydrogenated organic molecules as a liquid. More specifically, the disclosure provides a polyimide-based microchannel plate that is particularly useful for a process of immediate catalytic release of hydrogen from a hydrogenated organic molecule or formulation of molecules.

BACKGROUND

As anyone who drives a vehicle knows, the price of petroleum is rising rapidly due to increasing worldwide demand and a lack of new supply to address the increasing demand. Moreover, petroleum is a known source of greenhouse gasses that have been linked to global warming and a myriad of problems caused by global warming. That has led to a demand for alternative energy sources that can be used to power ever-increasing worldwide fleets of vehicles powered by internal combustion engines. One such alternative that is being rapidly developed is ethanol, but ethanol is made from food sources (sugar cane or corn) and that will rapidly compete with the need for such food sources for human and animal feed. Moreover, in the U.S. ethanol is not cost effective and requires a large government subsidy for utilization to make ethanol from corn. Clearly, ethanol is not a long-term solution.

Other avenues have been explored in what is referred to as "biodiesel" which is really methylesters from various plant oils that is required to be mixed with diesel fuel from traditional petroleum sources. Biodiesel requires plant oils as a starting material and is synthesized in an energy-intensive process that generates glycerol as a by-product. Some biodiesel has utilized waste cooking fats or used plant oil triglycerides as starting materials, but the synthesis process is more difficult due to the contamination of the used oils. But there are not enough such waste products in existence to be a realistic source for transportation needs.

Hydrogen has been considered an important long-term solution to the energy crisis of growing demand and dwindling supply due to the ability to generate hydrogen from renewable sources of energy (e.g., electricity such as wind power or hydropower) and the fact that the combustion product is water vapor. Hydrogen can be generated using known techniques by electrolysis of water or oxidation of other gasses such as methane or ammonia. Water electrolysis, in particular, is an attractive means for generating hydrogen gas. This is particularly important, as there is a growing capacity of wind-powered electricity generation. However, most wind blows at night when the electricity demand is the lowest (due to less need to drive air conditioning and the like). Therefore, if there is a reliable means for storing hydrogen, such stored hydrogen can serve as a means for storing excess electricity generated to be used for either transportation fuel or for generating electricity using a fuel cell. Right now it is estimated that up to 45% of electricity that is generated is wasted due to lack of demand when such electricity is generated. Therefore, there is a need in the art to be able to store and transport hydrogen with the ability to release the stored hydrogen on demand.

Hydrogen gas can be stored as a compressed gas or as a cryogenic liquid. Both methods are problematic. Storing hydrogen, as a gas requires large, heavy and thick storage vessels because hydrogen gas is less dense in terms of volume of storage for the weight of hydrogen gas stored. Moreover, when used for any transportation applications, such as a vehicle, the problem of a hydrogen gas storage tank is one of excessive weight and volume needed to power a vehicle for anything except a short distance (using a hydrogen internal combustion engine). The largest risk and drawback to a hydrogen tank in a moving application (such as a vehicle for either gas storage or cryogenic liquid storage) is that in any severe crash or even in the case of a terrorist attack, the presence of a hydrogen storage tank that is breached can unleash an excessively large explosion that can cause widespread and potentially catastrophic damage far beyond any other fuel or other improvised explosive device. Hydrogen powered vehicles using a hydrogen gas or cryogenic liquid storage tank would become the vehicle of choice for terrorist suicide or remote-controlled bombers. Further, cryogenic storage of hydrogen in a tank losses several percent of the stored hydrogen per day, leading to empty tanks whenever such a vehicle is left idle for a period of time (such as long term parking lots). Therefore, there is a need in the art to develop hydrogen storage and release technologies that avoid storing hydrogen in a gaseous or cryogenic liquid state.

Hydrogen storage technologies using larger molecules than $H_2$ have generally been developed into two basic means. Metal or chemical hydrides have been developed to store and release hydrogen. However, such hydrides are generally in more of a solid state of matter that do not lend themselves to fuel applications, particularly when trying to adopt existing fuel (petroleum) infrastructure to a newer hydrogen fuel applications. Moreover, such metal hydrides can be dehydrogenated but often cannot be recycled or rehydrogenated. Therefore, the application of metal or chemical hydrides will not be for transportation on a wide scale basis because they will cause massive environmental issues due to the need to dispose of dehydrogenated hydrides.

Spent forms of recyclable liquid fuels that release hydrogen gas, include aromatic compounds such as benzene and naphthlene (aromatic substrates) that undergo reversible hydrogenation to form cyclohexane and decalin, respectively. U.S. Pat. No. 6,074,447, for example, describes dehydrogenating methylcyclohexane, decalin, dicyclohexyl, and cyclohexane to toluene, naphthalene, biphenyl and benzene, respectively in the presence of an iridium catalyst at temperatures of 190° C. or higher. Yet even at such temperatures, hydrogen release reactions require several minutes for full release and often exist as solids at room temperatures. When one pushes on an accelerator petal to power a vehicle forward, it would be highly problematic in today's traffic to have to wait a minute or two before hydrogen fuel is release to the engine, yet a buffer system, if employed has all of the problems of storing gaseous hydrogen. Therefore, the requirement of immediate and complete dehydrogenation is a necessary and required characteristic of hydrogen fuel for any transportation application. The present disclosure addresses the need for immediate and complete release of all moles of hydrogen from such a fuel.

Liquid fuels have the advantage that they can be transported using existing petroleum infrastructure (e.g., pipelines and tankers, something ethanol cannot do) and often can be recycled or re-hydrogenated to avoid an environmental crisis if used in the field of transportation. There is an ongoing effort to develop and commercialize both internal combustion engines that utilize hydrogen as a fuel and fuel cells that also utilize hydrogen as a fuel. Both applications generate water upon combustion of the hydrogen gas with oxygen from the atmosphere. However, widespread use of such energy solutions requires better methods for storing, transporting and releasing hydrogen gas upon demand.

One form of hydrogen fuel for release, storage and recycling of hydrogen fuels uses a sulfur-containing heteroatom that is cyclized on dehygrogenation and when re-hydrogenated the ring is broken to form a linear, thiol-containing alkane moiety.

The use of ablation patterning of various polymeric materials, such as, polyimides, is disclosed in U.S. Pat. No. 4,508,749. This discloses, for example, a use of ultraviolet (U.V.) radiation for etching through a polyimide layer. Electrical connections are then made through the openings to the metal layer. U.S. Pat. No. 5,236,551 likewise discloses ablation etching for patterning a polymeric material layer which is then used as an etch mask for etch patterning, using wet or chemical etchants, an underlying layer of metal.

In a typical ablation process, a beam of laser energy is directed against an exposed surface of a body to be ablated. The laser energy is absorbed by the material and, as a result of photochemical, thermal and other effects, localized explosions of the material occur, driving away, for each explosion, tiny fragments of the material. The process requires that significant amounts of energy be both absorbed and retained within small volumes of the material until sufficient energy is accumulated in each small volume to exceed a threshold energy density at which explosions occur.

Polyimides are used in the process because such materials have a high absorptivity for U.V. light while having a relatively low thermal diffusivity for limiting the spread of the absorbed energy away from the volume where the energy was absorbed. When an excimer laser is used, because of the unique optical focusing requirements of the excimer laser it is important to the manufacturing process that the material to be ablated be flat, with a typical peak-to peak roughness of less than about 20 microns, for a given ablation operation.

SUMMARY

The present disclosure provides a process for forming a reactor module catalytic surface having a plurality of microchannels and a thermocouple, comprising:
(a) providing a base material;
(b) layering a coating of polyimide that covers the reaction module catalytic surface;
(c) laser ablating a plurality of microchannels to remove the coating of polyimide from only the microchannel areas;
(d) sputtering a conductive metal to coat all surfaces and form a thermocouple having a continuous catalytic surface, or forming a catalytic surface on the polyimide catalytic surface to form a discontinuous catalytic surface; and
(e) repeating steps (b), (c) and (d) a plurality of times, whereby each routine of steps (b), (c) and (d) adds about 20 µm of thickness to the walls of the microchannels.

Preferably, the layering of polyimide is done by a spin coating process. Preferably the layering of polyimide creates a layer of polyimide having a thickness of from about 10 µm to about 40 µm. Preferably, the base material is a material selected from the group consisting of glass, silicone, non-conductive metal, a transition metal, an alloy of transition metals, and combinations thereof. Preferably, the conductive metal for coating is selected from the group consisting of W, Cu, Ni, alloys thereof and different combinations for each repeat of step (d). Most preferably, the conductive metal is at least one round of W.

The present disclosure further provides a reactor module for catalytically releasing hydrogen gas from an organic fuel, comprising:
(a) a plurality of microchannels on a base material, having walls that are coated, continuously or discontinuously, with a catalytic surface;
(b) a plurality of microchannel walls comprising a thermocouple wherein the thermocouple comprises alternating layers of a conductive metal and a polymeric insulation layer; and
(c) a plurality of electrical leads in contact with the conductive metal for applying current to the thermocouple.

Preferably, the catalytic surface is gold. Preferably, the polymeric insulation layer is polyimide having a thickness of from about 10 µm to about 40 µm per layer. Preferably, the base material is a material selected from the group consisting of glass, silicone, non-conductive metal, a transition metal, an alloy of transition metals, and combinations thereof. Preferably, the conductive metal for coating is selected from the group consisting of W, Cu, Ni, alloys thereof and different combinations for each repeat of step (d). Most preferably, the conductive metal is at least one round of W.

DETAILED DESCRIPTION

Figure 1:
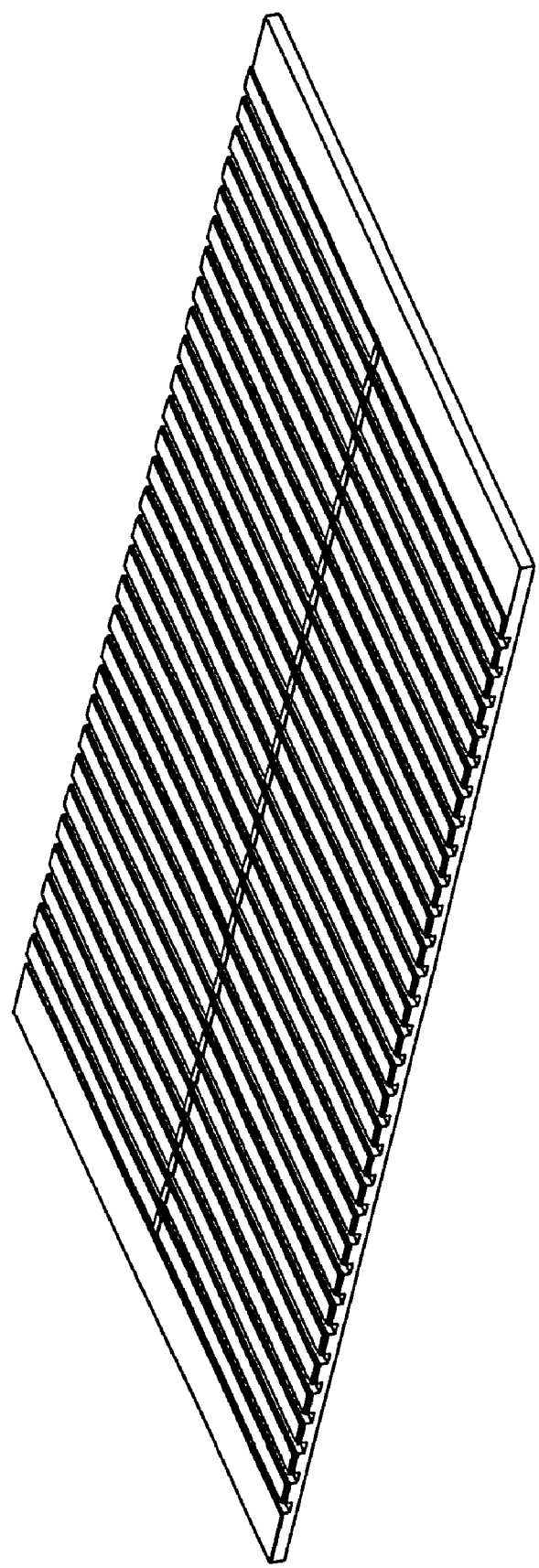
FIG. 1 shows an ablated plate reactor without the final polyimide covering.
Figure 2:
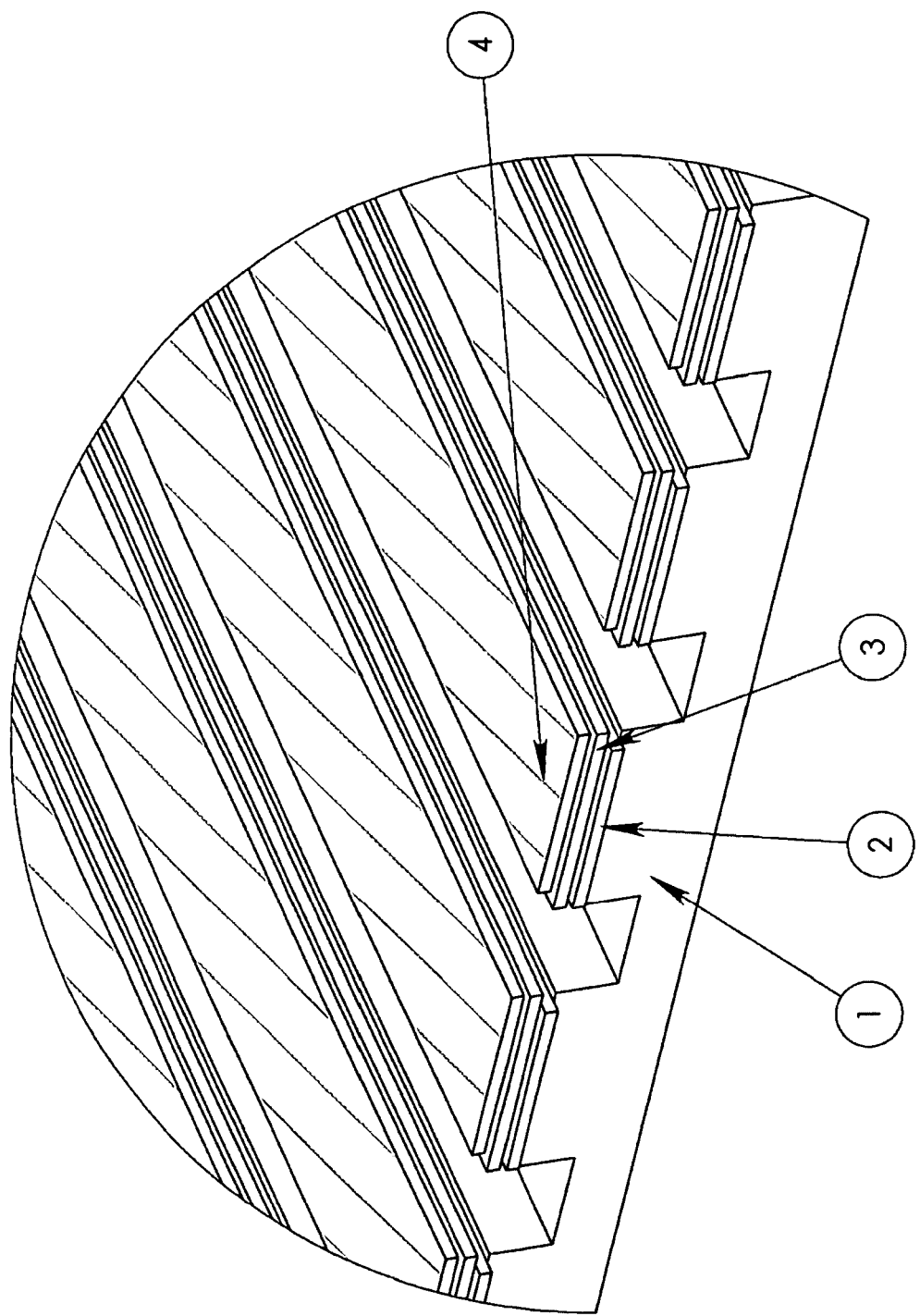
FIG. 2 shows the channel end detail of the ablated plate reactor of FIG. 1, showing the various layers. Specifically, (1) is a polyimide base showing an ablated channel, (2) is the tungsten heating element showing the electrical contact, (3) is an insulator of polyimide, and (4) is one conductor of the thermocouple.
Figure 3:
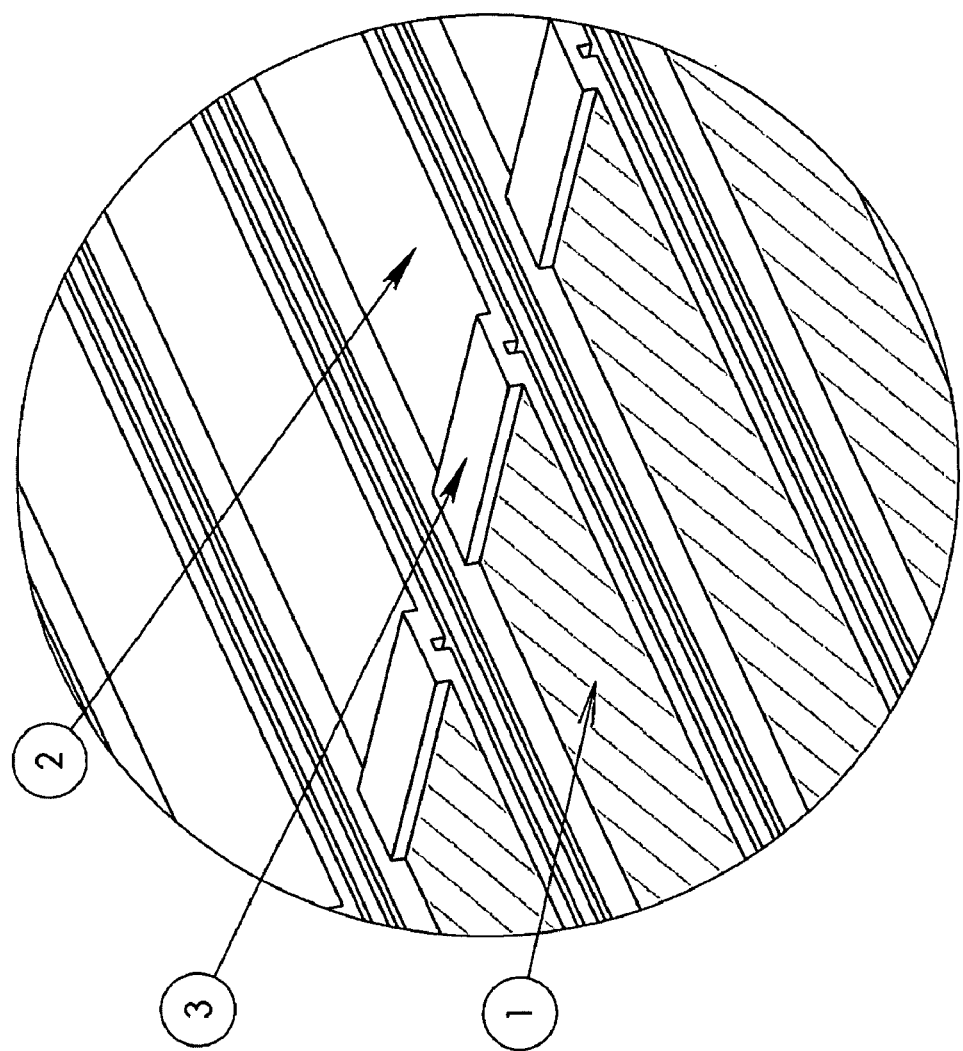
FIG. 3 shows a thermocouple junction. Specifically, (1) is iron, (2) is Constantan (alloy of iron and nickel), and (3) is the junction where the actual measurement is made.
Figure 4:
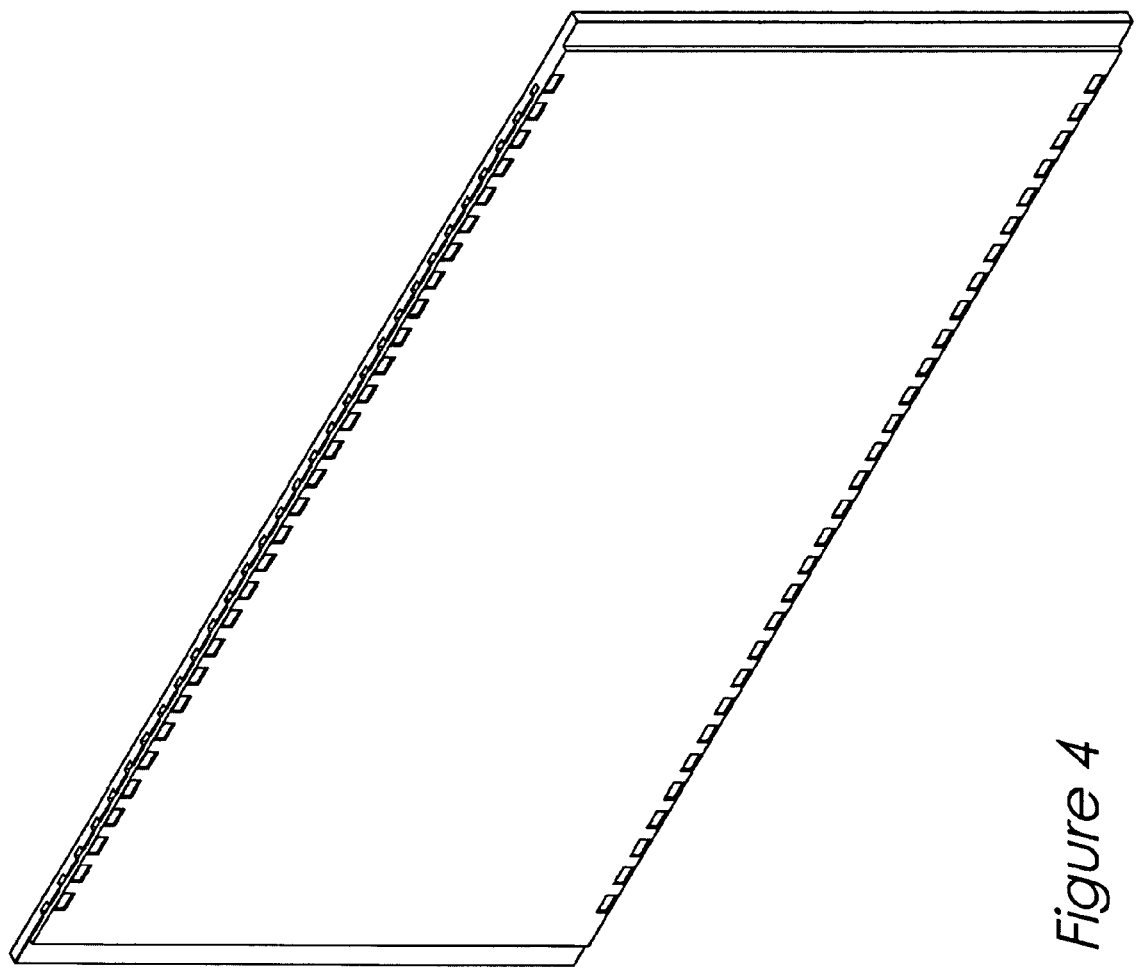
FIG. 4 shows a final plate without the end manifolds.
Figure 5:
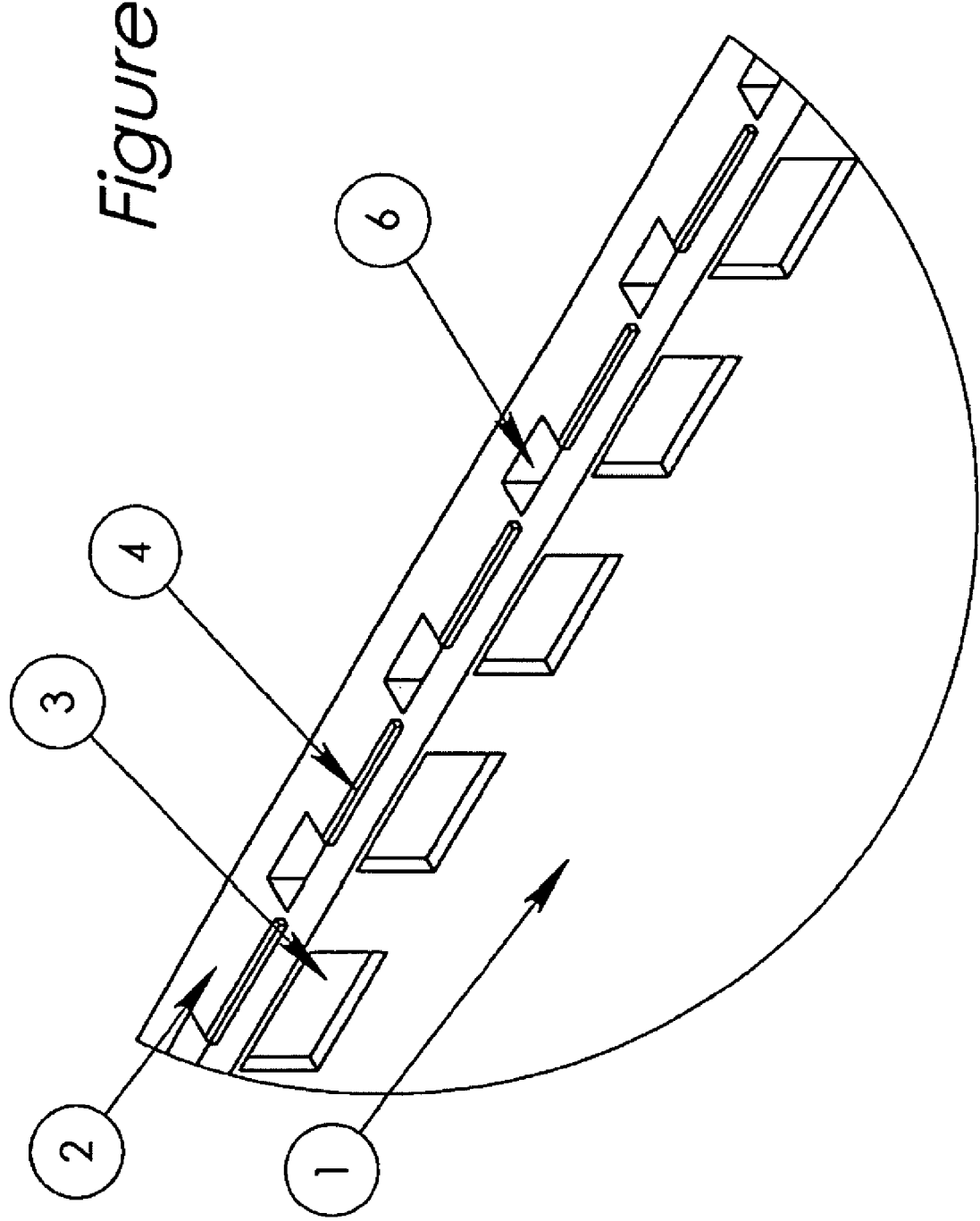
FIG. 5 shows the end details of the channels. Specifically, (1) is the polyimide top cover over the channels, (2) polyimide base which has the channels, (3) a thermocouple connection exposed thru the polyimide, one end, (4) tungsten connection, one end, and (6) microchannel opening.

The term "microchannel" refers to a channel with at least one dimension, of 1 mm or less, preferably in a direction perpendicular to net flow through the channel. The term "mesochannel" refers to a channel with at least one dimension, in a direction perpendicular to net flow through the channel, of 1 cm or less. For both, the optimum design usually includes orienting the height of the channel in the direction for which rapid heat and/or mass transport is desired.

The performance of various techniques in laser cutting channels in various materials is investigated with various power, scan rate and other factors. A laser of wavelength of about 308 nm produces a series of 50 channels such that each channel is about 50800 µM long, 10 µM wide to a depth of 250

μM. Channel to channel pitch is 3 μM. Sidewall draft is perpendicular to the bottom of the channels or better than 5°. Debris is held to a minimum.

One of the problems with fuel cell powered vehicles is the long start up times required by chemical reactor systems that produce hydrogen for the fuel cell from hydrocarbon fuels. A solution to this problem is to store a small portion of the hydrogen produced during normal operation and then releasing the stored hydrogen to restart a fuel cell. Typically, only a very small part of the hydrogen produced during operation is stored in a sorption pump, preferably less than 10%, more preferably 1% or less. The system, in which hydrogen flows from at least one hydrogen-storage sorption pump to at least one fuel cell, can be an integrated unit or separate units connected by appropriate conduits. The system could be configured such that all of the product or only a part of the product from a reformer passes through the sorption pump(s).

Excimer laser ablation enables precise drilling and/or ablation processes to less than one micron. To be useful, however, many such ablated devices must be laminated to other polymeric materials, whether for structural and/or for functional reasons. Since the ablation process is often very precise, it is useful from a manufacturing point of view in many instances to ablate the polymer after the lamination process. Furthermore, because of the unique optical focusing requirements of the excimer laser it is important to the manufacturing process that the material to be ablated be flat, with a typical peak-to peak roughness of less than about 20 microns, i.e., .+−.10 microns for a given ablation operation.

The typical material of choice for excimer laser ablation is polyimide. However, the thermal expansion coefficient of polyamide is about $5 \times 10^{-6}$ cm/cm° C., characterizing it a having the lowest coefficient of thermal expansion of the most commonly used polymers. Since polyimide has the lowest coefficient of expansion of most commonly used polymers, maintaining requisite flatness during an ablation process can be very difficult, as any change in temperature can cause materials (e.g., the polyimide component of the multilaminate) to come under compression. Further, and possibly even a more common occurrence, is that the polyimide layer can become wrinkled during the lamination process, prior to excimer laser treatment. In these scenarios, surface flatness is not maintained and the drilling process becomes imprecise. In order to maintain surface flatness for an ablation operation, it is desirable that the ablated material be under surface tension relative to its laminate layer.

In many cases, a fuel cell system is sensitive to "impurity" gases or non-hydrogen product gases. Thus, in preferred embodiments, fuel cell systems incorporate a sorption pump or pumps of the type described herein to remove water, $CO_2$, hydrocarbons, etc. to produce a purified hydrogen stream. Separate pumps could be used to remove differing components (such as water and $CO_2$), or individual cells or units within a single integrated pump could be used to remove differing components. While such purification systems can be employed in systems with an auxiliary hydrogen-storage sorption pump, they may of course be advantageously employed in any fuel cell systems that utilize gas purification, and these systems (without the hydrogen-storage sorption pump are also part of the present invention).

Catalyst Loading for Discontinuous Surface

Loading Au catalyst onto the polyimide film was done with a polyimide film supported on a glass slide. The procedure provided 100 mg of gold chloride ($HAuCl_4$) dissolved in 160 mL of DI water. 1080 μL of 1N sodium hydroxide was added to the solution to adjust the pH to 7. A polyimide film supported on the glass slide was immersed into the solution for 2 hours. The polyimide film was washed with DI Water and dried with air flow. The film was calcined in air at 200° C. for 2 hours with a 0.73° C./min ramp rate.

Additional catalytic surfaces composed of catalysts other than gold or alloys of catalysts or mixtures of catalysts onto polyimide can be formed using the same process. The following Table 1 lists different metal catalysts the meal salt used and other process parameters.

TABLE 1

| Metal | Metal salt | Additive | Metal salt conc. (nM) | Stirring time (hours) |
|---|---|---|---|---|
| Au | $HAuCl_4$ | 1N NaOH | 1-10 | 2-24 |
| Pt | $H_2PtCl_6$ | | 1-10 | 2-24 |
| Pt—Au | $H_2PtCl_6$—$HAuCl_4$ | 1N NaOH | 1-10 | 2-24 |
| Rh | $RhCl_3$ | | 1-10 | 2-24 |

After synthesis of the catalytic surface, the surface is treated or calcined in air according to the parameters of Table 2 below:

TABLE 2

| Metal | gas | Gas flow (ml/min) | Temp (° C.) | Dwell time (hours) |
|---|---|---|---|---|
| Au | Air, hydrogen, oxygen | 0-100 | 200-300 | 2-8 |
| Pt | Air, hydrogen, oxygen | 0-100 | 200-300 | 2-8 |
| Pt—Au | Air, hydrogen, oxygen | 0-100 | 200-300 | 2-8 |
| Rh | Air, hydrogen, oxygen | 0-100 | 200-300 | 2-8 |

We claim:

1. A process for forming a reactor module catalytic surface having a plurality of microchannels and a thermocouple, comprising:
   (a) providing a base material;
   (b) layering a coating of polyimide that covers the reaction module catalytic surface;
   (c) laser ablating a plurality of microchannels to remove the coating of polyimide from only the microchannel areas;
   (d) sputtering a conductive metal to coat all surfaces and form a thermocouple having a continuous catalytic surface, or forming a catalytic surface on the polyimide catalytic surface to form a discontinuous catalytic surface; and
   (e) repeating steps (b), (c) and (d) a plurality of times, whereby each routine of steps (b), (c) and (d) adds about 20 μm of thickness to the walls of the microchannels.

2. The process for forming a reactor module catalytic surface of claim 1 wherein the layering of polyimide is done by a spin coating process.

3. The process for forming a reactor module catalytic surface of claim 1 wherein the layering of polyimide creates a layer of polyimide having a thickness of from about 10 μm to about 40 μm.

4. The process for forming a reactor module catalytic surface of claim 1 wherein the conductive metal is at least one round of W.

5. A reactor module for catalytically releasing hydrogen gas from an organic fuel, comprising:
   (a) a plurality of microchannels on a base material, having walls that are coated, continuously or discontinuously, with a catalytic surface;
   (b) a plurality of microchannel walls comprising a thermocouple wherein the thermocouple comprises alternating layers of a conductive metal and polymeric insulation layer; and (c) a plurality of electrical leads in contact with the conductive metal for applying current to the thermocouple.

6. The reactor module for catalytically releasing hydrogen gas from an organic fuel of claim 5 wherein the catalytic surface is gold.

7. The reactor module for catalytically releasing hydrogen gas from an organic fuel of claim 5 wherein the polymeric insulation layer is polyimide having a thickness of from about 10 μm to about 40 μm per layer.

8. The reactor module for catalytically releasing hydrogen gas from an organic fuel of claim 5 wherein the base material is a material selected from the group consisting of glass, silicone, non-conductive metal, a transition metal, a alloy of transition metals, and combinations thereof.

9. The reactor module for catalytically releasing hydrogen gas from an organic fuel of claim 5 wherein the conductive metal for coating is selected from the group consisting of W, Cu, Ni, alloys thereof and different combinations for each repeat of step (d).

10. The reactor module for catalytically releasing hydrogen gas from an organic fuel of claim 9 wherein the conductive metal is at least one round of W.

* * * * *